US007290714B2

(12) United States Patent
Halbur et al.

(10) Patent No.: US 7,290,714 B2
(45) Date of Patent: Nov. 6, 2007

(54) STORED-VALUE CARD WITH LIGHT

(75) Inventors: Ted C. Halbur, Lino Lakes, MN (US);
Dave B. Smith, St. Paul, MN (US);
Timothy P. Clegg, Manhatten Beach, CA (US)

(73) Assignee: Target Brands, Inc., Minneapolis, MN (US)

( * ) Notice: Subject to any disclaimer, the term of this patent is extended or adjusted under 35 U.S.C. 154(b) by 158 days.

(21) Appl. No.: 11/038,018

(22) Filed: Jan. 18, 2005

(65) Prior Publication Data

US 2006/0157556 A1  Jul. 20, 2006

(51) Int. Cl.
*G06K 7/00* (2006.01)
(52) U.S. Cl. .................. 235/487; 283/57; 235/488; 235/493
(58) Field of Classification Search ........... 235/380, 235/375, 382.5, 492, 487, 488, 493; 283/57
See application file for complete search history.

(56) References Cited

U.S. PATENT DOCUMENTS

| 3,351,268 | A |   | 11/1967 | Schroeder |
| 4,055,014 | A |   | 10/1977 | Schmidt et al. |
| 4,299,041 | A |   | 11/1981 | Wilson |
| 5,387,108 | A |   | 2/1995 | Crowell |
| 5,577,918 | A |   | 11/1996 | Crowell |
| 5,789,733 | A |   | 8/1998 | Jachimowicz et al. |
| 5,918,909 | A | * | 7/1999 | Fiala et al. .................. 283/61 |
| 5,927,846 | A |   | 7/1999 | Sinclair |
| 6,019,284 | A |   | 2/2000 | Freeman et al. |
| 6,068,183 | A |   | 5/2000 | Freeman et al. |
| 6,070,990 | A |   | 6/2000 | Dalton et al. |
| 6,109,762 | A |   | 8/2000 | Hallgrimsson et al. |
| 6,402,039 | B1 |  | 6/2002 | Freeman et al. |
| 6,447,143 | B2 |  | 9/2002 | Krietzman et al. |
| 6,454,435 | B1 |  | 9/2002 | Altman |
| 6,508,569 | B2 |  | 1/2003 | Krietzman et al. |
| 6,533,436 | B2 |  | 3/2003 | Krietzman et al. |

(Continued)

FOREIGN PATENT DOCUMENTS

GB  2 277 482  11/1994

OTHER PUBLICATIONS

Selg et al., "Stored-Value Card with Sound", U.S. Appl. No. 11/037,385, filed Jan. 18, 2005.

(Continued)

*Primary Examiner*—Daniel Hess
(74) *Attorney, Agent, or Firm*—Ingrassia Fisher & Lorenz, P.C.

(57) ABSTRACT

A stored-value card includes a housing and a light circuit. The housing defines a first primary panel and a second primary panel spaced from the first primary panel. The first primary panel defines an account identifier signifying a financial account linked to the stored-value card. A side is defined between the first primary panel and the second primary panel. The light circuit includes a light and a switch and is generally enclosed within the housing but for the light. The light extends from the side of the housing and is configured to be illuminated upon application of a force to the switch. Stored-value card assemblies and methods of using a stored-value card are also disclosed.

31 Claims, 9 Drawing Sheets

U.S. PATENT DOCUMENTS

| | | |
|---|---|---|
| 6,543,809 B1 * | 4/2003 | Kistner et al. ................ 283/57 |
| 6,769,618 B1 | 8/2004 | Finkelstein |
| 6,817,532 B2 | 11/2004 | Finkelstein |
| 6,902,116 B2 | 6/2005 | Finkelstein |
| 2002/0169608 A1 | 11/2002 | Tamir et al. |
| 2003/0107884 A1 | 6/2003 | Krietzman et al. |
| 2003/0192209 A1 * | 10/2003 | Yeh ........................ 40/124.02 |
| 2004/0238625 A1 | 12/2004 | Walker et al. |
| 2005/0207165 A1 | 9/2005 | Shimizu et al. |
| 2005/0211785 A1 * | 9/2005 | Ferber et al. ............... 235/492 |

OTHER PUBLICATIONS

Dean et al., "Stored-Value Card with Sound and Light", U.S. Appl. No. 11/038,011, filed Jan. 18, 2005.

* cited by examiner

STORED-VALUE CARD WITH LIGHT

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card including a housing and a light circuit. The housing defines a first primary panel and a second primary panel spaced from the first primary panel. The first primary panel defines an account identifier signifying a financial account linked to the stored-value card. A side is defined between the first primary panel and the second primary panel. The light circuit includes a light and a switch and is generally enclosed within the housing but for the light. The light extends from the side of the housing and is configured to be illuminated upon application of a force to the switch. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services from e.g. a retail store or website. According to one embodiment, an original consumer buys the stored-value card to give a recipient who in turn is able to use the stored-value card at a retail store or setting to pay for goods and/or services. The stored-value card, according to embodiments of the present invention, provides the consumer and recipient with extra amusement in addition to the ability to pay for goods and/or services with the stored-value card. In particular, the stored-value card presents the original consumer and the recipient the ability to illuminate at least a portion of the stored-value card.

In some embodiments, the light of the stored-value card emphasizes the relationship of the stored-value card to a particular occasion, such as a wedding, new baby, graduation, holiday, season, etc. The light may also relate to printed indicia on the stored-value card for unifying the overall appearance of the illuminated light and the remainder of the stored-value card. For example, in the case of a Christmas holiday, a consumer purchases the stored-value card including indicia relating to the Christmas holiday, such as a Christmas tree, and a light positioned to be a tree ornament. In other embodiments, the stored value card relates to another life event such as a birthday and includes illustrations incorporating the light, such as a clown with a lighted nose, button, eye, etc. Accordingly, the recipient of the holiday card can enjoy the amusement of light display, and can also use the stored-value card to shop for a gift or other items.

Figure 1:
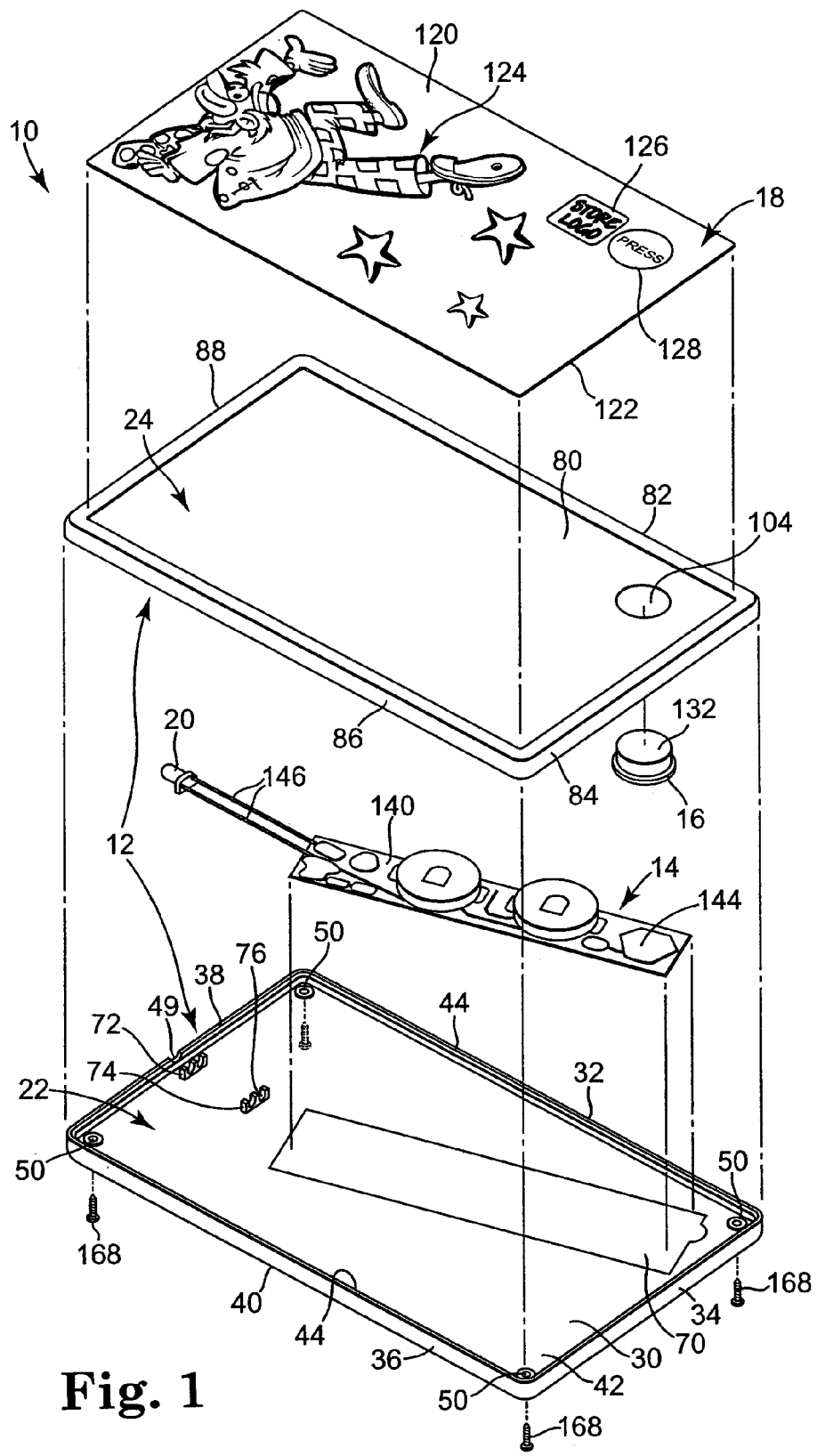
FIG. 1 is an exploded, top perspective view of one embodiment of a stored-value card, according to the present invention.

Turning to the figures, FIG. 1 illustrates an exploded, top perspective view of one embodiment of a stored-value card 10, according to the present invention. Stored-value card 10 includes a housing 12, a light circuit 14, a button 16, and a face panel 18. Light circuit 14 and button 16 are each at least partially enclosed within housing 12. In particular, button 16 is positioned to interact with light circuit 14. In particular, upon depression of button 16 by a user, light circuit 14 is activated to illuminate a light 20 included in light circuit 14. Face panel 18 is optionally adhered to housing 12 to provide indicia relating to one or more of an occasion, season, store identifier, brand identifier, media format indicia (e.g. characters, logos, scenes, or other illustrations or photographs relating to at least one of a movie, television show, book, video game, etc.), etc.

Figure 2A:
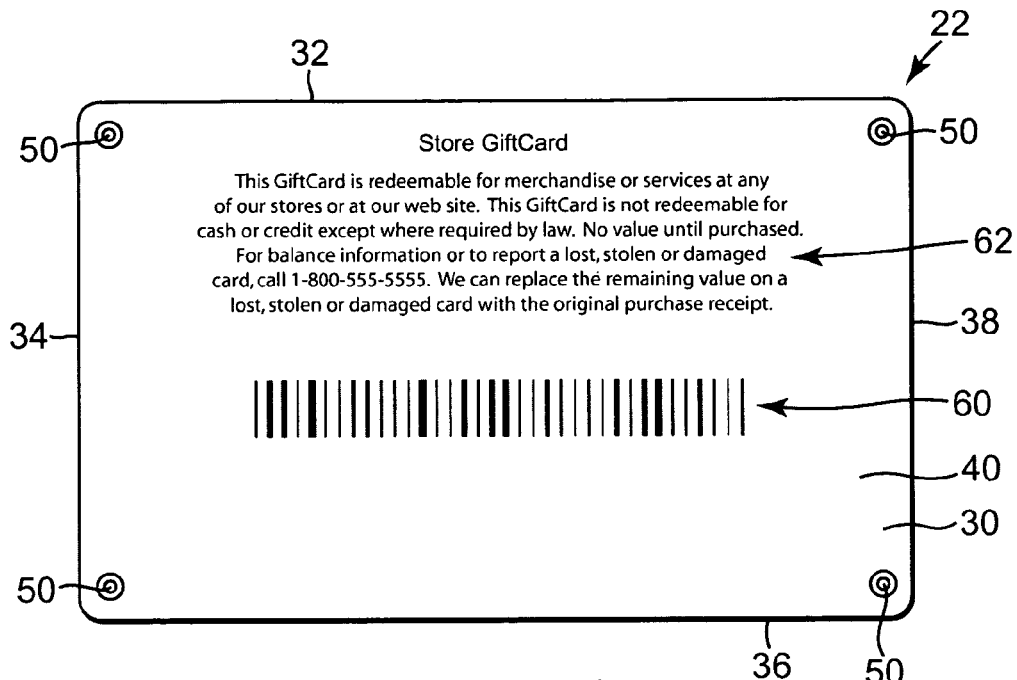
FIG. 2A is a bottom view of one embodiment of a base the stored-value card of FIG. 1, according to the present invention.
Figure 2B:
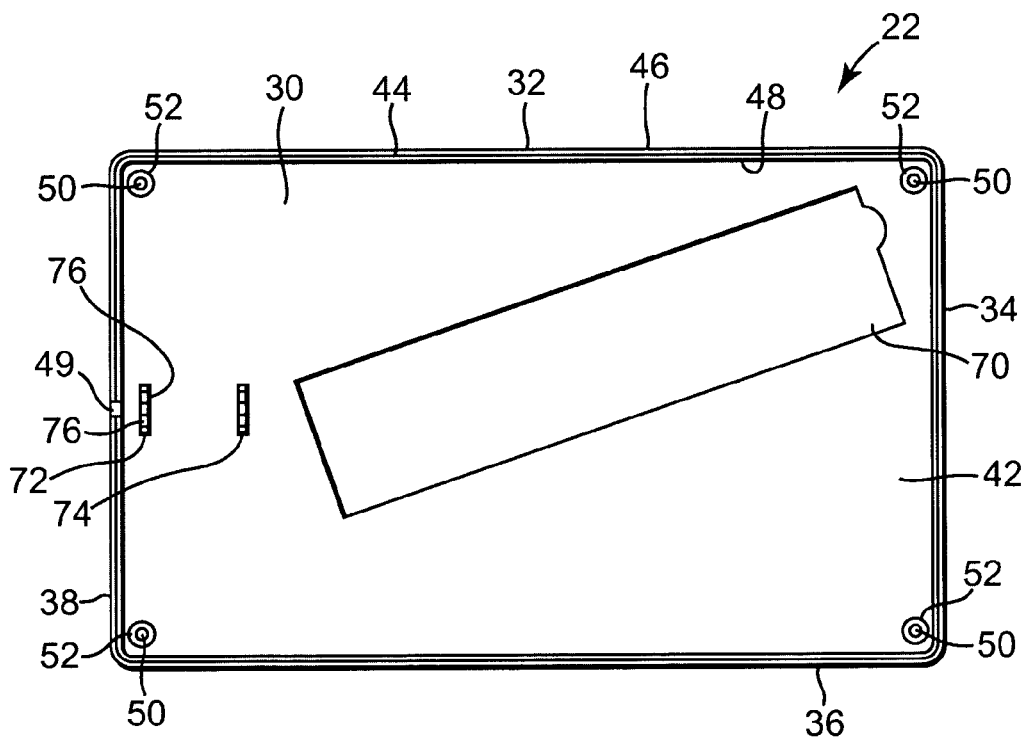
FIG. 2B is a top view of one embodiment of the base of FIG. 2.

Housing 12 includes a first housing member 22 and a second housing member 24. In one embodiment, first housing member 22 is a base, and second housing member 24 is a cover. One embodiment of base 22 is illustrated in FIGS. 2A and 2B. Base 22 generally includes a primary panel 30 and side walls 32, 34, 36, and 38. Primary panel 30 is generally planar and defines an outside surface 40 and an inside surface 42 opposite outside surface 40. In one embodiment, primary panel 30 is generally rectangular and sized similarly to an identification card, a credit card, or other card sized to fit in a wallet of a user. In other embodiments, primary panel 30 is otherwise shaped as a square, circle, oval, star, or any other suitable shape.

Side walls 32, 34, 36, and 38 each extend from inside surface 42 away from outside surface 40 and collectively extend generally about the entire perimeter of primary panel 30. In one embodiment, each side wall 32, 34, 36, and 38 extends with a generally perpendicular orientation relative to primary panel 30. In particular, first side wall 32 is positioned opposite and extends generally parallel to third side wall 36. Second side wall 34 and fourth side wall 38 extend between first side wall 32 and third side wall 36 opposite and generally parallel to one another.

Each side wall 32, 34, 36, and 38 stems from primary panel 30 to collectively define an inside edge 44. In one example, inside edge 44 is formed as a stepped edge including a first portion 46 and a second portion 48. First portion 46 extends from primary panel 30 a further distance than second portion 48 extends from primary panel 30 as illustrated with additional reference to FIG. 1. In one example, first portion 46 generally extends about the perimeter of second portion 48. In this respect, edge 44 is formed as a stepped edge with the lower, second portion 48 being positioned just inside the higher, first portion 46. In one embodiment, at least first portion 46 forms curved or chamfered corners at the intersection of each side wall 32, 34, 36, and 38 with another of side walls 32, 34, 36, and 38. A notch 49 is defined by fourth side wall 38. In particular, notch 49 extends from inside edge 44 down into fourth side wall 38 to terminate in a rounded manner. In one example, notch 49 is generally centered along the length of fourth side wall 38.

A plurality of apertures 50 extend through primary panel 30. More particularly, each aperture 50 extends from outside surface 40 through inside surface 42. In one embodiment, an aperture 50 is positioned near the intersection of each side wall 32, 34, 36, and 38 with another one of side walls 32, 34, 36, and 38. In one embodiment, apertures 50 are sized to at least partially receive a connection device, such as a screw or other device for coupling base 22 with cover 24. In one example, each aperture 50 allows the head of the screw or other attachment device to be recessed and, accordingly, includes a slightly larger section nearer outside surface 40 than near inside surface 42. In one embodiment, a cylindrical protrusion 52 extends from inside surface 42 around each aperture 50.

Outside surface 40 includes an account identifier 60 such as a barcode, magnetic strip, a smart chip or other electronic device, a radio frequency identification device, or other suitable identifier readily readable by a point-of-sale terminal or other account access station or kiosk. Account identifier 60 indicates a financial account or record to which stored-value card 10 is linked. The account or record of the monetary balance on stored-value card 10 optionally is maintained on a database, other electronic or manual record-keeping system, or, in the case of "smart" cards for example, on a chip or other electronics or devices on stored-value card 10 itself. Accordingly, by scanning account identifier 60, a financial account or record linked to stored-value card 10 is identified and can subsequently be activated, if amounts are debited therefrom, and/or have amounts added thereto. With the above in mind, account identifier 60 is one example of means for linking stored-value card 10 with a financial account or record and of means for activating or loading value on stored-value card 10.

In one embodiment, redemption indicia 62 are included on outside surface 40. Redemption indicia 62 indicate that stored-value card 10 is redeemable for the purchase of goods and/or services and that, upon use, a value of the purchased goods and/or services will be deducted from the financial account or record linked to stored-value card 10. In one embodiment, redemption indicia 62 include phrases such as "<NAME OF STORE>GiftCard" and "This GiftCard is redeemable for merchandise or services at any of our stores or at our web site," and/or provides help or phone line information in case of a lost, stolen, or damaged stored-value card, etc. In one embodiment, other indicia are also included on outside surface 40.

In one embodiment, inside surface 42 defines a light assembly indentation 70, a first light holder 72, and a second light holder 74. Indentation 70 is generally positioned to correspond with the positioning of light circuit 14 within housing 12 upon assembly. Indentation 70 is defined as an area where primary panel 30 is a slightly lesser thickness than other areas of primary panel 30. In this respect, light assembly indentation 70 provides additional clearance for light circuit 14 to fit between base 22 and cover 24. With this in mind, in one example, light assembly indentation 70 is generally shaped similarly to light circuit 14.

Light holders 72 and 74 are adapted to support a portion of light circuit 14 and to maintain that portion of light circuit 14 spaced from inside surface 42 of primary panel 30. In one embodiment, each light holder 72 and 74 includes notches 76, illustrated with additional reference to FIG. 1, for receiving a portion of light circuit 14. Light holders 72 and 74 are integrally formed as one piece with the remainder of base 22. Conversely, light holders 72 and 74 can be separately formed and coupled to inside surface 42 of base 22. In one example, only one light holder 72 or 74 is included in base 22.

Figure 3A:
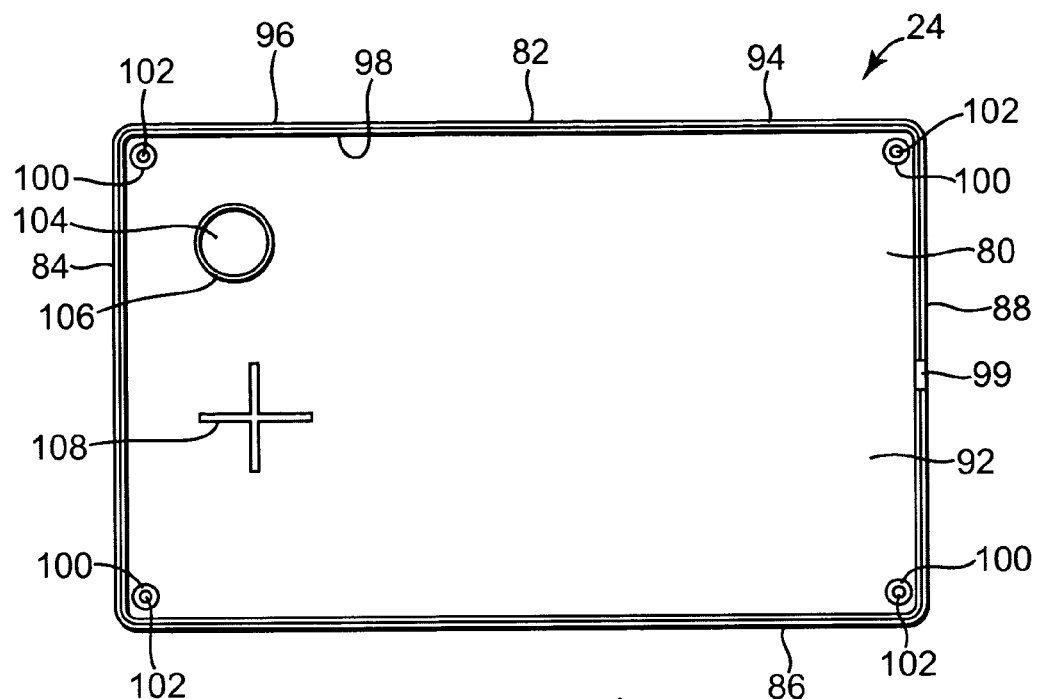
FIG. 3A is a bottom view of one embodiment of a cover of the stored-value card of FIG. 1, according to the present invention.
Figure 3B:
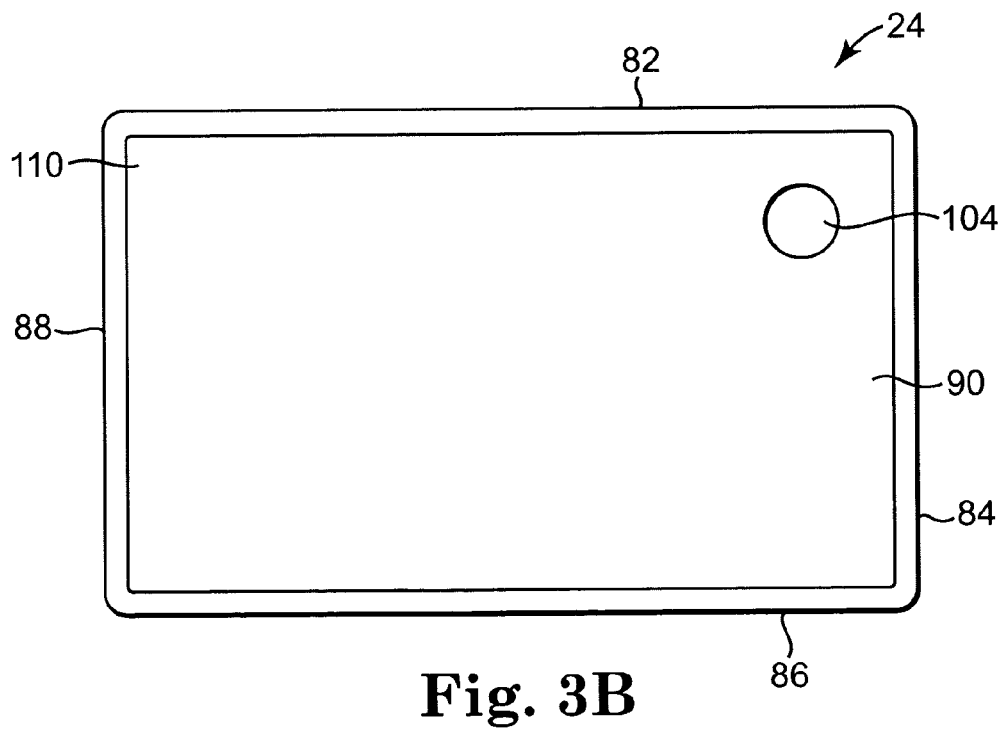
FIG. 3B is a top view of one embodiment of the cover of FIG. 3A.

One embodiment of cover 24 is illustrated in FIGS. 3A and 3B. Cover 24 generally includes a primary panel 80 and side walls 82, 84, 86, and 88. Primary panel 80 is generally planar and defines an outside surface 90 and an inside surface 92 opposite outside surface 90. In one embodiment, primary panel 80 is generally sized similarly to primary panel 30 of base 22. Side walls 82, 84, 86, and 88 each extend from inside surface 92 and collectively extend generally about the entire perimeter of primary panel 80. For example, each side wall 32, 34, 36, and 38 extends with a generally perpendicular orientation relative to primary panel 80. In particular, first side wall 82 is positioned opposite and generally parallel third side wall 86. Second side wall 84 and fourth side wall 88 extend between first side wall 82 and third side wall 86 opposite and generally parallel to one another.

Each side wall 82, 84, 86, and 88 extends from primary panel 80 to collectively form an inside edge 94 opposite primary panel 80. In one embodiment, inside edge 94 is a stepped edge including a first portion 96 and a second portion 98. In one embodiment, first portion 96 extends from primary panel 80 a smaller distance than second portion 98 extends from primary panel 80. First portion 96 generally extends around the perimeter of second portion 98. In this respect, inside edge 94 is formed as a stepped edge with higher, second portion 98 being positioned just inside lower, first portion 96. In one embodiment, the corners of inside edge 94 formed at the intersections of side walls 82, 84, 86, and 88 with another of side walls 82, 84, 86, and 88 are rounded or chamfered. A notch 99 is defined by fourth side wall 88. In particular, notch 99 extends from inside edge 94 into fourth side wall 88 to terminate in a rounded manner. In one embodiment, notch 99 is generally centered along the length of fourth side wall 88.

Cover 24 includes a plurality of protrusions 100 extending from inside surface 92 parallel to side walls 82, 84, 86, and 88. One protrusion 100 is positioned near each of the corners of edges 94 (i.e. near the intersections of side walls 82, 84, 86, and 88 with another side wall 82, 84, 86, and 88). In one embodiment, each protrusion 100 extends further from inside surface 92 than each side wall 82, 84, 86, and 88 extend beyond inside surface 92. Each protrusion 100 is positioned on cover 24 to generally align with one of apertures 50 of base 22 upon assembly. A threaded cavity 102 is formed within each protrusion 100. In one embodiment, each threaded cavity 102 is configured to receive a screw or other connection device for coupling base 22 with cover 24.

A button aperture 104 extends through primary panel 80. Button aperture 104 is sized and shaped to receive button 16. In one embodiment, a raised rim 106 extends upward from inside surface 92 generally around the perimeter of button aperture 104. In one example, button aperture 104 and raised rim 106 are positioned to correspond with the positioning of at least a portion of light circuit 14 as will be further described below.

In one embodiment, cover 24 includes at least one spacer or protrusion 108 extending from inside surface 92 parallel to the general extension of side walls 82, 84, 86, and 88. Protrusion 108 is configured to interact with inside surface 42 of base 22 upon assembly. Accordingly, protrusion 108 is configured to prevent collapse or cave-in of stored-value card 10 in areas where primary panels 30 and 80 of base 22 and cover 24, respectively, are not fully supported relative to each other by components within housing 12, such as light circuit 14. In one example, protrusion 108 is shaped as an "X" or cross extending from inside surface 92. Other suitable protrusions or spacers are also contemplated to facilitate prevention or at least decreasing the chance of collapse of housing 12 of stored-value card 10 near the protrusion or spacer.

Turning to FIG. 3B, outside surface 90 partially defines button apertures 104. In addition, in one embodiment, a panel indentation 110 is defined on outside surface 90 and is sized and configured to receive face panel 18.

In one embodiment, each of base 22 and cover 24 is formed by injection molding of a plastic such as PVC or any other suitable material to define the various attributes of base 22 and cover 24. Other methods of forming base 22 and cover 24 are also contemplated. In one embodiment, in which base 22 is formed by injection molding, account identifier 60, redemption indicia 62, and any other indicia or information are printed onto outside surface 40 injection molded base 22.

In one embodiment, base 24 and cover 24 are each formed of materials having a similar or identical color. In other embodiments, base 22 and cover 24 may be formed of materials having different coloring. For example, in one embodiment, base 22 is formed of a white material to best display printed indicia 62, 60, etc. on its outer surface 40 while cover 24 is formed of a different colored material to correspond with and/or complement the coloring of face panel 18.

Face panel 18 is generally planar and is formed of paper, plastic, or other suitable material. In one embodiment, face panel 18 is sized to fit within panel indentation 110 of cover 24. With this in mind, panel 18 includes a first, outer surface 120 and a second, inner surface 122. First surface 120 includes indicia such as decorative indicia 124, brand indicia 126, and a button indicator 128. In one embodiment, decorative indicia 124 relate to a particular occasion, such as a wedding, new baby, graduation, holiday, season, etc., or a particular character, brand identifier, store identifier, media format indicia, or other visual design to promote the purchase of stored-value card 10.

Accordingly, face panel 18 provides one example means for associating stored-value card 10 with at least one of a product brand, a store, a holiday, a season, an occasion, a life event, and media format indicia. In one particular embodiment, decorative indicia 124 include a picture or a graphic representing an animal or character, e.g. a clown, and other secondary indicia, e.g. balloons, or any others suitable combination of indicia relating to a particular holiday, life event, etc. Brand indicia 126 identify a brand associated with stored-value card 10, such as identifying a product brand, a store brand, etc.

Button indicator 128 is positioned on face panel 18 to generally align with button 16 upon assembly. In this respect, button indicator 128 indicates where the bearer, e.g., the customer or recipient, can push on stored-value card 10 to illuminate light 20, as will be further described below. Other combinations or selections of information or indicia to be displayed on face panel 18 are also contemplated. In an alternative embodiment, indicia described to be included on face panel 18 are directly printed to cover 24. In one embodiment, first, outside surface 120 of face panel 18 is printed and finished in any one of a variety of ways, such as matte, gloss, textured, or other suitable effect or finish. In one example, the finish is selected to further compliment the indicia included on first, outside surface 120.

Second, inside surface 122 is configured to interface with cover 24 within indentation 110. In one embodiment, face panel 18 is adhered to cover 24 with any suitable adhesive. In other embodiments, face panel 18 is formed on an adhesive backed plastic, paper, cardstock, etc. and is directly applied and adhered to cover 24.

Figure 4:
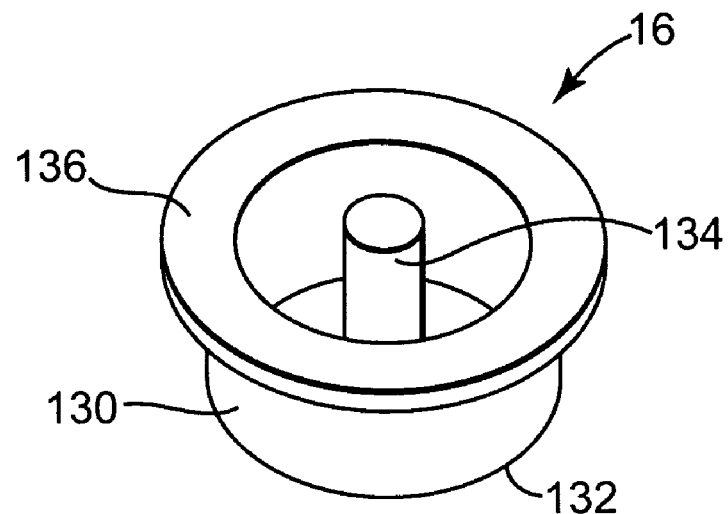
FIG. 4 is a bottom, perspective view of one embodiment of a button of a stored-value card, according to the present invention.

FIG. 4 illustrates a perspective view of one embodiment of button 16 of stored-value card 10. Button 16 generally includes a relatively short hollow cylinder 130, an end wall 132, and a pin 134. End wall 132 extends across one end of hollow cylinder 130. Pin 134 extends from end wall 132 through the center of cylinder 130. In one embodiment, pin 134 extends from end wall 132 a distance further than cylinder 130 extends from end wall 132. Pin 134 is relatively rigid. A ring or rim 136 extends about the perimeter of cylinder 130 on an end opposite end wall 132. More particularly, rim 136 extends radially outwardly from cylinder 130 and, therefore, has a larger diameter than cylinder 130. Cylinder 130 is sized with a diameter sufficient to fit within button aperture 104. Conversely, rim 136 has a diameter greater than the overall diameter of button aperture 104 of cover 24.

Figure 5:
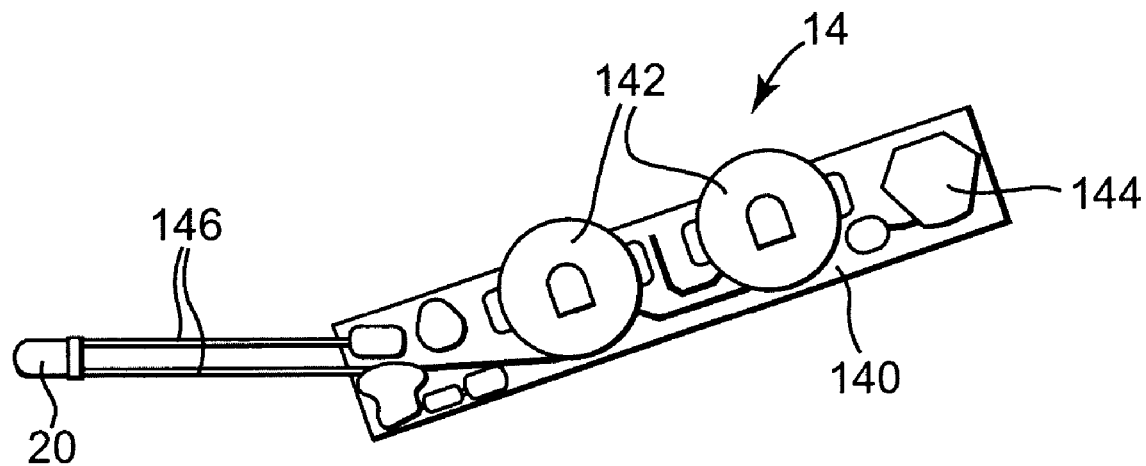
FIG. 5 is a top view of one embodiment of a light circuit of a stored-value card, according to the present invention.

FIG. 5 illustrates one embodiment of light circuit 14. Light circuit 14 includes a printed circuit board (PCB) 140, light 20, at least one battery 142, and a switch 144, and provides one example of means for providing illumination to stored-value card 10. Light 20, battery 142, and switch 144 are each mounted to PCB 140 and are each electrically coupled to the other components 20, 142, 144, and 146 of light circuit 14. In one embodiment, PCB 140 includes electrical traces, one or more resistors, one or more capacitors, and/or any suitable number of other electrical components facilitating the proper function of audio circuit 14 and/or electrical connection of electrical components mounted on PCB 140.

Battery 142 provides electrical power to PCB 140 and light 20. In one embodiment, battery 142 includes an alkaline battery such as a standard AG10 1.5 volt battery or any other suitable battery or batteries. In one example, light 20 is coupled to PCB 140 via leads 146, which extend away from PCB 140. Leads 146 extend from PCB 140 generally parallel to one another to interface with light 20 generally opposite PCB 140. In one example, leads 146 are elongated metal rods, which conduct the flow of electricity between light 20 and the remainder of light circuit 14. Leads 146 are sufficiently stiff and rigid to maintain light 20 generally suspended from leads 146 within housing 12.

In one embodiment, light 20 includes a light-emitting diode (LED), although any other suitable source of illumination may be alternatively or additionally utilized. For example, light 20 is one of clear or colored LED. Although only a single light 20 is illustrated, a plurality of lights may be included in stored-value card 10 as desired.

In one embodiment, switch 144 is a snap or pressure sensitive switch mounted to PCB 140 in a manner causing the illumination of light 20 upon depression of switch 144. Depression of switch 144 closes light circuit 14 thereby drawing current from the at least one battery 142 to light 20. Current from battery 142 serves to power and illuminate light 20. In one example, light circuit 14 includes a timer (not shown) for regulating the length of time light 20 is illuminated following depression of switch 144. In one embodiment, the current drawn by light circuit 14 during times of non-illumination of light 20 is sufficiently low to allow, for a number of months or years, the at least one battery 142 to provide power to light circuit 14.

Figure 6:
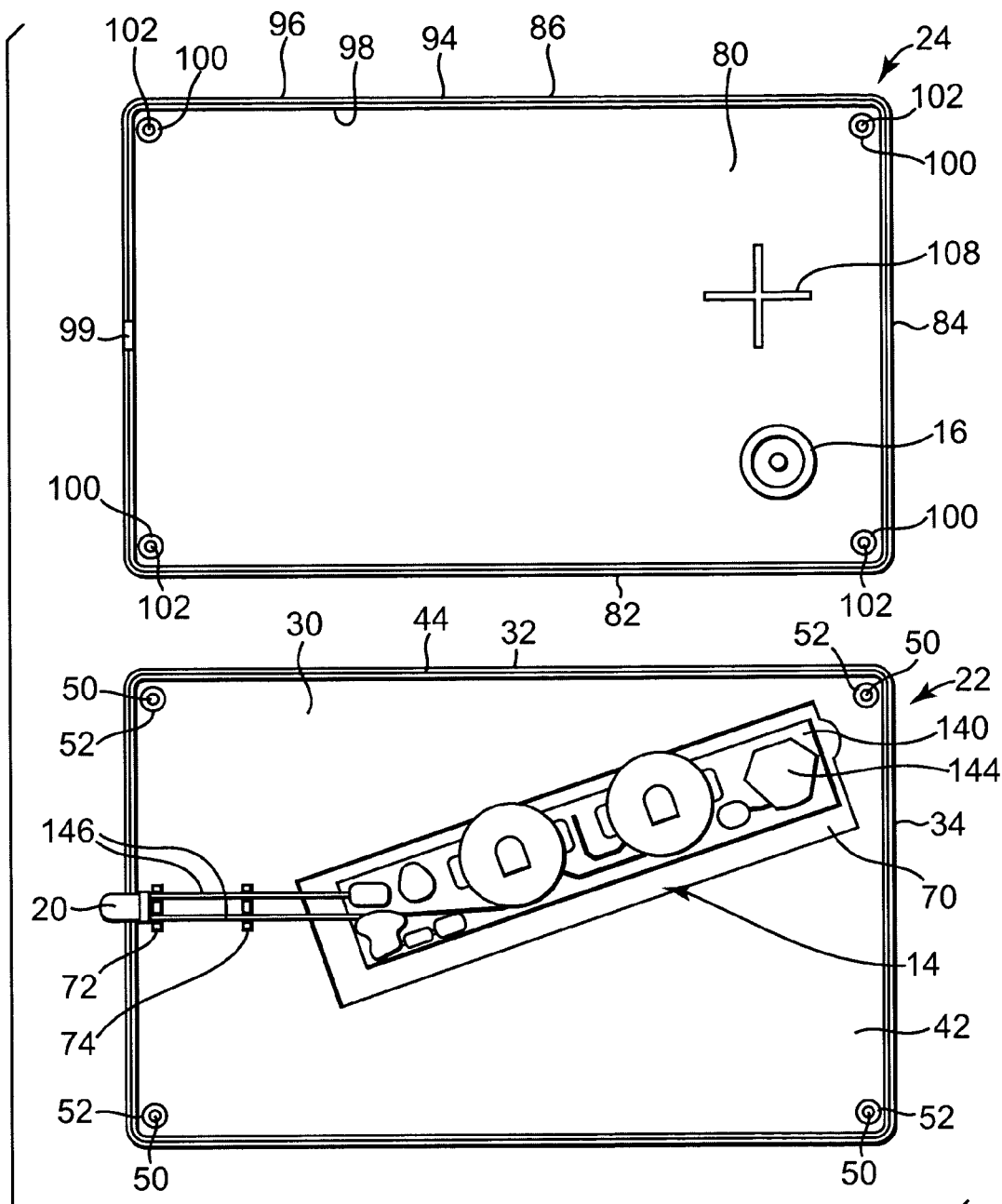
FIG. 6 is a top view of one embodiment of a partially assembled stored-value card, according to the present invention.

As illustrated in the embodiment of FIG. 6, during assembly, light circuit 14 is coupled to base 22. In particular, PCB 140 of light circuit 14 is adhered to base 22 within light assembly indentation 70. More specifically, light circuit 14 is placed within indentation 70 of base 22 such that switch 144 generally aligns with button aperture 104 of cover 24 upon assembly. In one embodiment, placement of light circuit 14 also places light 20 to extend over notch 49 of base 22 and leads 146 to extend over and be at least partially supported by light holders 72 and 74. In one example, light 20 extend or protrudes outside of an outer perimeter of base 22. Accordingly, the light circuit 14 is adhered to housing 12, more particularly, to base 22.

Button 16 is placed within button aperture 104 such that cylinder 130 of button 16 fits within rim 106 of button aperture 104 and rim 136 of button 16 interfaces with rim 106 of button aperture 104. In this respect, rim 106 of button 16 prevents button 16 from falling through button aperture 104 towards the outside of cover 24.

Once light circuit 14, and button 16 are in place, cover 24 is placed upon base 22, or vice versa, thereby generally aligning button 16 with switch 144 of light circuit 14 and interposing light 20 between base 22 and cover 24 to extend through notches 49 and 99. In this respect, light 20 extends out of side wall 38 and 88 beyond the general outer perimeter of stored-value card 10. Accordingly, light 20 so positioned is one example of means for providing illumination to at least a portion of the side wall of stored-value card 10.

Additionally, base 22 and cover 24 are positioned so inside edge 44 of base 22 interfaces with inside edge 94 of cover 24. More specifically, first portion 46 and second portion 48 of inside edge 44 interface with first portion 96 and second portion 98 of inside edge 94, respectively. The stepped surface provides for a stable and generally neat coupling of base 22 and cover 24. Housing 12 formed by base 22 and cover 24 is one example of means for at least partially housing light circuit 14.

Once cover 24 is mated with base 22, each aperture 50 in base 22 generally aligns with one of threaded cavities 102 in cover 24. Attachment mechanisms, such as screws 158 are threaded through apertures 50 and into corresponding threaded cavities 102. In this respect, base 22 is secured to cover 24. Other methods of securing base 22 to cover 24, such as with adhesive or a snap fit, are also contemplated. Accordingly, housing 12 is an example means for housing light circuit 14. In one embodiment, assembled housing 12 is generally about 54 mm wide, about 85.6 mm long, and about 7 mm thick.

Following securing of base 22 to cover 24, face panel 18 is applied to outside surface 90 of cover 24. In particular, face panel 18 is fit within panel indentation 110. Accordingly, face panel 18 is adhered in place to cover 24. When aligned and placed on cover 24, button indicator 128 of face panel 18 generally aligns with button 16. In one embodiment, upon assembly, face panel 18 is applied to cover 24 to coordinate placement of decorative indicia 124 with the position of light 20. More particularly, in an example in which decorative indicia 124 includes a clown with a portion of clown adjacent to the expected placement of one of its eyes, buttons, clothing spots, nose, etc. being positioned near an edge of face panel 18 and light 20 is a red light, upon assembly, light 20 is positioned generally adjacent to or to otherwise correspond with the expected position of the eye, button, spot of clothing, nose, etc. of the clown. With this in mind, illumination of the light appears as a glowing red nose of the clown.

Other configurations and combinations of decorative indicia 124 and light 20 are also contemplated in which decorative indicia 124 depicts a first portion of a subject or scene and light 20 provides a second portion of the subject or scene. For example, other characters, objects, animals, etc. can be used in place of the clown as the subject and light 20 can be clear or be anyone of a variety of colors placed to represent any portion of the subject. In other embodiments, face panel 18 is applied to cover 24 before assembling cover 24 with button 16 and/or base 24. Accordingly, face panel 18 is one example of means for providing decorative indicia to primary surface 30 of cover 24.

Upon assembly, stored-value card 10 functions to both amuse the card bearer, e.g. consumers and/or recipients, and to entice consumers to purchase stored-value card 10. In particular, upon a consumer or recipient pressing face panel 18 in a position corresponding with button indicator 128, button 16 is depressed thereby depressing switch 144 of light circuit 14. Depression of switch 144 completes light circuit 14 (i.e., draws current from battery 142 towards light 20 as illustrated with reference to FIG. 5) causing light 20 to be illuminated, and thereby adding to the overall visual effect of stored-value card 10. As such, button 16 and/or switch 144 provide one example of means for activating or illuminating light circuit 14 upon a demand by the bearer of stored-value card 10. Therefore, the consumer and/or recipient are presented with both a stored-value card and a source of additional amusement.

Figure 7A:
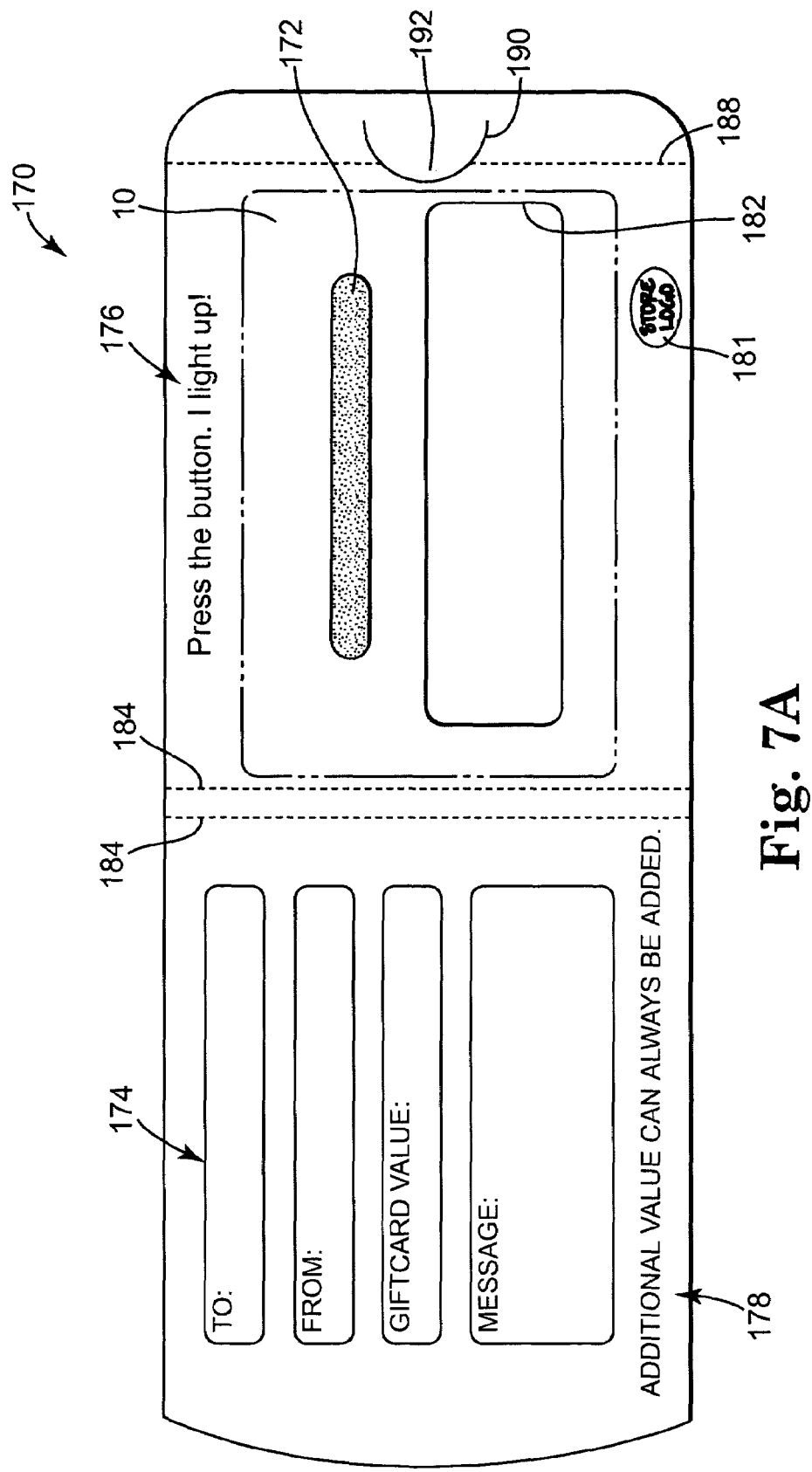
FIG. 7A is a front view of one embodiment of an unfolded backer for a stored-value card, according to the present invention.
Figure 7B:
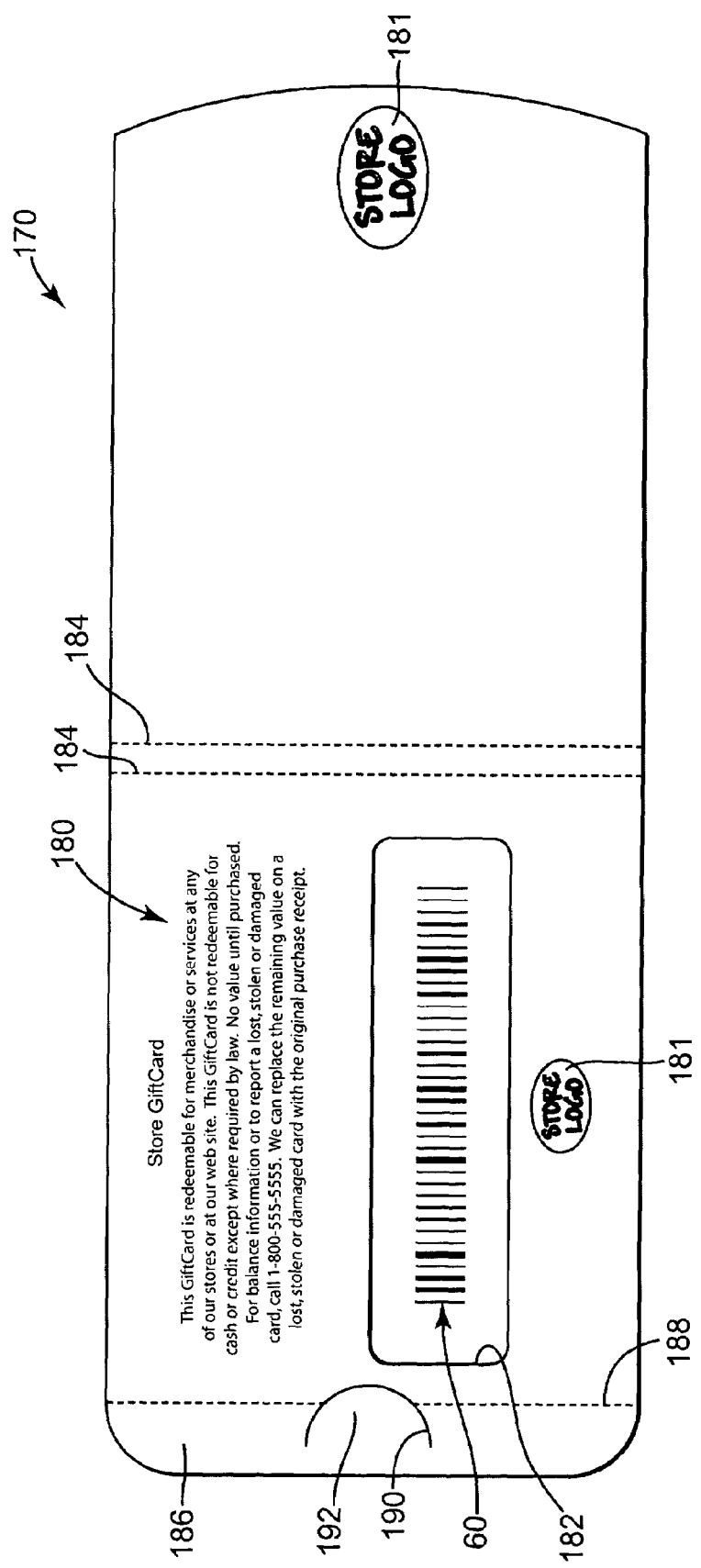
FIG. 7B is a back view of the unfolded backer of FIG. 7A.

FIGS. 7A and 7B illustrate a carrier or backer 170 for supporting stored-value card 10. Stored-value card 10 is readily releasably attached to backer 170, for example by an adhesive 172 or the like, and is represented in phantom lines in FIG. 7A. Backer 170 comprises a single layer or multiple layers of paper or plastic material, for example, generally in the form of a relatively stiff but bendable/flexible card. Other materials area also contemplated. Backer 170 displays indicia, graphics or text information including store logo(s), store name(s), slogans, advertising, instructions, directions, brand indicia, promotional information, media format indicia (e.g. characters, logos, scenes, or other illustrations or photographs relating to at least one of a movie, television show, book, video game, etc.), and/or other information. With this in mind, backer 170 provides one example means for associating stored-value card 10 with at least one of a product brand, a store, a holiday, a season, an occasion, and media format indicia.

Indicia 174, for example, include to, from, initial gift card value, and message fields. Indicia 176 promote that stored-value card 10 includes a playable sound or audible file. In particular, in one example, indicia 176 encourage a user to press stored-value card 10 to cause the audio file to be played. For example, in one embodiment, indicia 176 state "Press the button. I light up!" Indicia 178 notify a user and promotes that additional value can always be added to stored-value card 10.

Indicia 180 indicate that stored-value card 10 is redeemable for the purchase of goods and/or services and that, upon use, a value of the purchased goods and/or services will be deducted from the financial account or record linked to stored-value card 10. In one embodiment, indicia 180 include phrases such as "<NAME OF STORE>GiftCard" and "This GiftCard is redeemable for merchandise or services at any of our stores or at our website," and/or provides help or phone line information in case of a lost, stolen, or damaged stored-value card 10, etc. Indicia 181 identify a store, brand, department, etc. and/or services associated with stored-value card 10. Any of indicia 174, 176, 178, 180, 181, or other indicia, optionally may appear anywhere on backer 170 or stored-value card 10. Additional information besides that specifically described and illustrated herein also may be included.

Backer 170 defines a window or opening 182 for displaying account identifier 60 of stored-value card 10 as illustrated in FIG. 7B. As previously described, account identifier 60 is adapted for accessing a financial account or record associated with stored-value card 10 for activating, loading, or debiting from the account or record. Accordingly, window 182 allows access to account identifier 60 to activate and/or load stored-value card 10 without removing stored-value card 10 from backer 170.

In one embodiment, backer 170 is a bi-fold substrate defining fold line(s) 184, about which backer 170 is foldable roughly in half. In FIGS. 7A and 7B, backer 170 is unfolded, i.e. is in an open configuration. According to one embodiment, FIG. 7A illustrates surfaces of backer 170 that will be supported on a rack or other fixture to face a customer of a retail store who is considering the purchase of stored-value card 10. In another example, while on display in a retail store, backer 170 is folded back about at least one of fold lines 184 to present only the surfaces of backer 170 illustrated in FIG. 7A and positioned on the same side of fold lines 184 as stored-value card 10 to a consumer. In such an embodiment, indicia 174 and 178 would not be visible to a consumer when backer 170 and stored-value card are placed for display in the retail store.

Figure 8:
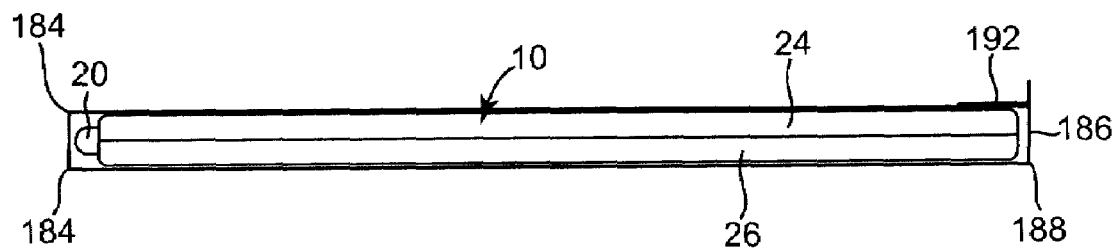
FIG. 8 is a side view of one embodiment of a packaged stored-value card, according to the present invention.

After purchase, backer 170 is foldable about fold lines 184 such that the FIG. 7A surfaces of backer 170 are folded towards each other and stored-value card 10 is enclosed in a compact package formed by folded backer 170 as illustrated with additional reference to the side view of FIG. 8. In this manner, the surfaces of backer 170 illustrated in FIG. 7B are disposed toward the outside of the folded, compact package, according to embodiments of the invention. In one example, backer 170 folded as illustrated in FIG. 8 effectively wraps stored-value card 10 for presentation from a consumer to a recipient. In one embodiment, fold lines 184 are two fold lines slightly spaced from one another to accommodate a thickness of stored-value card 10. Folding in the other direction about fold lines 184, or about other fold line(s) of backer 170, is also contemplated.

In one embodiment, backer 170 additionally includes a tab 186 extending from one edge of backer 170 running parallel to fold lines 184. An additional fold line 188 runs between tab 186 and the remainder of backer 170. In addition, a generally semi-circular cut 190 is formed from tab 186 through fold line 188 and partially onto the remainder of backer 170. In one embodiment, cut 190 is generally centered upon tab 186 and backer 170. Accordingly, semi-circular cut 190 defines a generally semi-circular flap 192 which can be partially bent away from the remainder of tab 186 and backer 170.

More specifically, upon folding of backer 170 about fold lines 184, tab 186 is folded upward about fold line 188 and flap 192 is pulled away from tab 186 to interface with an opposing edge of backer 170. In this respect, the opposing edge of backer 170 can be tucked beneath flap 192 to maintain backer 170 in a folded position as illustrated in FIG. 8. Backers similar to backer 170 can be used with various sizes and shapes of stored-value card 10. Other backers or packages are also contemplated for supporting stored-value card 10. Backer 170 is one example of means for removably supporting stored-value card 10 for display in a retail setting.

Figure 9:
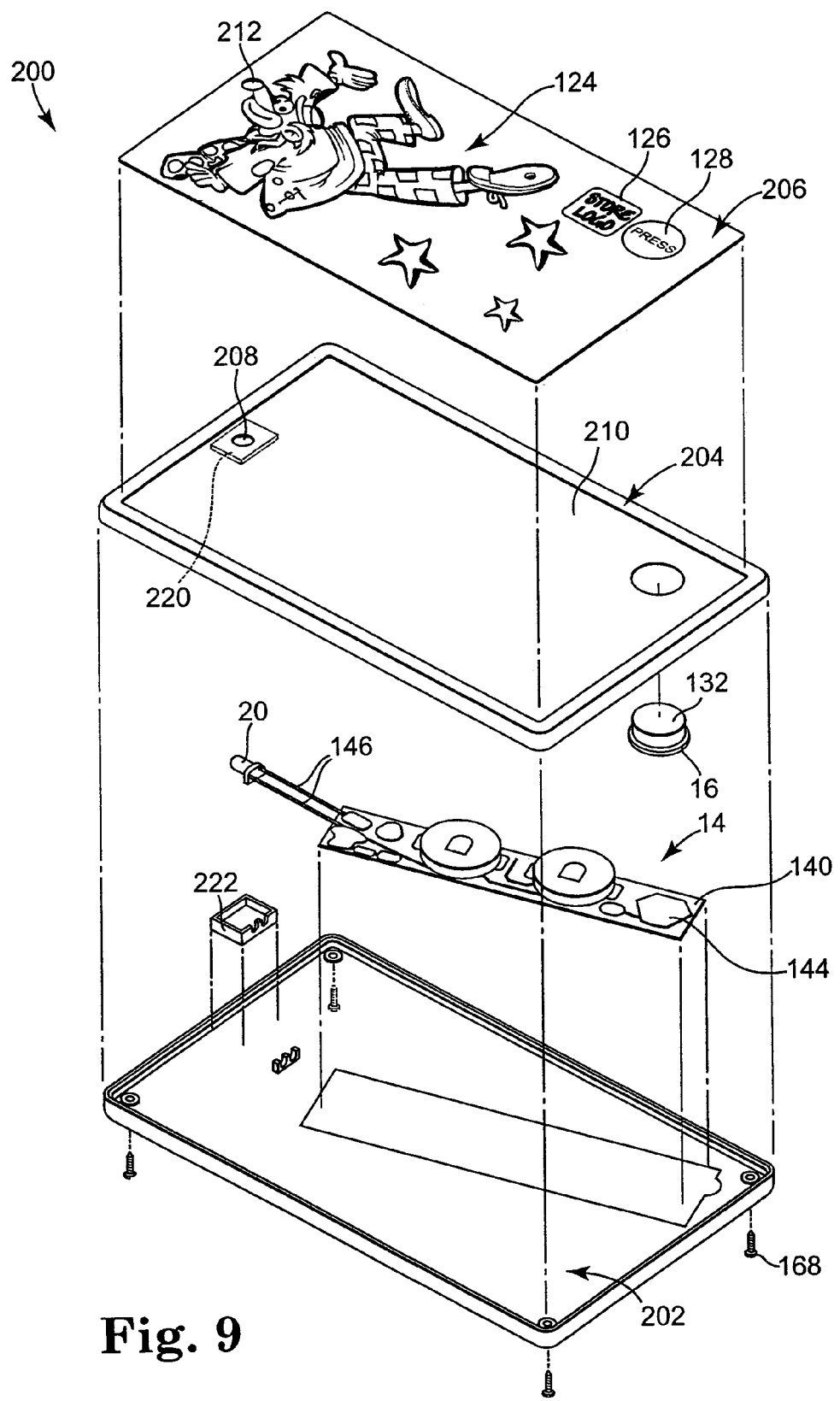
FIG. 9 is an exploded, top perspective view of one embodiment of a stored-value card, according to the present invention.

FIG. 9 illustrates another embodiment of a stored-value card generally at 200. Stored-value card 200 is similar to stored-value card 10 except for those characteristics specifically enumerated herein. Stored-value card 200 includes a base 202, a cover 204, and a face panel 206 similar to base 22, cover 24, and face panel 18, respectively. However, cover 204 includes a light aperture 208 formed through a primary panel 210, similar to primary panel 80. Accordingly, light will be emitted from light 20 through a top surface (e.g. primary panel 80) of stored-value card 200 rather than protruding outside the outer perimeter of stored-value card 10, such as out an edge or side wall of the stored-value card as described with respect to stored-value card 10 above. Face panel 206 also includes a light aperture 212 positioned to generally align with light aperture 208 of cover 204 upon assembly of stored-value card 200.

Once stored-value card 200 is assembled, light circuit 14 is positioned such that light 20 fits within the interior of base 202 (i.e. is fully maintained within the housing and does not extend beyond one of side walls 32, 34, 36, and 38). Cover 204 is applied to base 202 as described above and results in light 20 generally aligning with light apertures 208 and 212 of cover 204 and face panel 206, respectively. In one embodiment, a color filter and/or diffusive sheet 220 (indicated in dashed lines) is adhered to an inside surface of cover 204 to diffuse or color the light emitted out of stored-value card 200 from light 20 during use. Diffusive sheet 220 is formed of cellophane, paper, or other suitable material.

In one embodiment, a light containment device 222, such as a box or channel, is placed generally about light 20 in order to contain light emitted from light 20. More specifically, light containment device 222 is open towards light aperture 208 but closed off in at least one other direction relative to light 20. In this respect, light aperture 208 directs emitted light toward light aperture 208 and at least partially blocks or impedes disbursement of light 208 throughout the inside of stored-value card 200. By directing light toward light aperture 208, a larger amount of light is emitted for viewing by a customer or recipient. Combinations of lights extending outside of housing 12, as for stored-value card 10, and lights contained within housing 12, as for stored-value card 200, are also contemplated.

Stored-value cards come in many forms, according to embodiments of the invention. The gift card, like other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value card. The balance associated with a stored-value card declines as the card is used, encouraging repeat visits. The card remains in the user's purse or wallet, serving as an advertisement or reminder to re-visit the associated merchant. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value card 10 or 200 optionally is a physical card made of plastic, paper, generally stiff paper, other substrate, or the like. Adding value to stored-value card 10 or 200 optionally includes adding either a fixed amount or an amount that can be chosen by the customer or other user. Other modifications within the scope of the invention in its various embodiments will be apparent to those of ordinary skill.

What is claimed is:

1. A stored-value card comprising:
   a housing including a first primary panel and a second primary panel spaced from the first primary panel, wherein the first primary panel defines an account identifier signifying a financial account linked to the stored-value card, and wherein a side is defined between the first primary panel and the second primary panel; and
   a light circuit including a light and a switch, the light circuit being generally enclosed within the housing but for the light, wherein the light extends from the side of the housing and is configured to be illuminated upon application of a force to the switch, wherein the housing includes an aperture generally aligned with the switch of the light circuit, and the stored-value card further comprises:
   a button placed at least partially within the aperture of the housing and configured to interface with the switch, wherein the button and the switch are adapted such that depressing the button applies the force to the switch to illuminate the light.

2. The stored-value card of claim 1, further comprising:
   a face panel coupled to the first primary panel of the housing and including decorative indicia, wherein the decorative indicia depict a first portion of a subject, and the light is positioned to represent a second portion of the subject adjacent to the first portion of the subject.

3. The stored-value card of claim 2, wherein the decorative indicia generally relate to at least one of a brand identifier, a store identifier, an occasion, a holiday, a season, and media format indicia.

4. The stored-value card of claim 2, wherein the face panel includes a button indicator instructing a user where to press the stored-value card to illuminate the light.

5. The stored-value card of claim 1, wherein a face panel is adhered to and extends over a portion of the housing and an end wall of the button.

6. The stored-value card of claim 1, wherein the housing includes:
   a base; and
   a cover coupled to the base;
   wherein the light circuit is generally disposed between the base and the cover.

7. The stored-value card of claim 6, wherein the base is a first color and the cover is a second color.

8. The stored-value card of claim 1, in combination with a carrier releasably supporting the stored-value card.

9. The combination of claim 8, wherein the carrier includes a window adapted to display the account identifier for viewing external to the carder.

10. The combination of claim 8, wherein the carrier includes indicia representing that the store-value card includes the light configured to be illuminated upon user contact with the button.

11. The combination of claim 8, wherein the carrier is adapted to be selectively foldable between a first configuration and a second configuration, the first configuration is adapted to display the stored-value card in a retail setting, and the second configuration is adapted to wrap the stored-value card for presentation to a recipient.

12. A stored-value card comprising:
    a housing including a first primary panel and a second primary panel spaced from the first primary panel, wherein the first primary panel defines an account identifier signifying a financial account linked to the stored-value card, and wherein a side is defined between the first primary panel and the second primary panel; and
    a light circuit including a light and a switch, the light circuit being generally enclosed within the housing but for the light, wherein the light extends from the side of the housing and is configured to be illuminated upon application of a force to the switch;
    wherein the housing includes a base and a cover coupled to the base, and the light circuit is generally disposed between the base and the cover, and wherein the cover defines the first primary panel and the base defines the second primary panel, the cover and the base each including a plurality of side walls extending from the respective primary panel, wherein the plurality of side walls of the cover abut the plurality of side walls of the base.

13. The stored-value card of claim 12, further comprising:
    a face panel coupled to the first primary panel of the housing and including decorative indicia, wherein the decorative indicia depicts a first portion of a subject, and the light is positioned to represent a second portion of the subject adjacent to the first portion of the subject.

14. The stored-value card of claim 13, wherein the decorative indicia generally relate to at least one of a brand identifier, a store identifier, an occasion, a holiday, a season, and media format indicia.

15. The stored-value card of claim 13, wherein the face panel includes a button indicator instructing a user where to press the stored-value card to illuminate the light.

16. The stored-value card of claim 12, wherein the housing includes an aperture aligned with the switch of the light circuit, and the stored-value card further comprises a button placed at least partially within the aperture of the housing and configured to interface with the switch, wherein the button and the switch are adapted such that pressing the button applies the force to the switch to illuminate the light.

17. The stored-value card of claim 16, further comprising a face panel adhered to and extending over a portion of the housing and an end wall of the button.

18. The stored-value card of claim 12, wherein the base is a first color and the cover is a second color.

19. The stored-value card of claim 12, further including a spacer enclosed within the housing configured to prevent the housing from collapsing at a position near to the spacer.

20. The stored-value card of claim 12, in combination with a carrier releasably supporting the stored-value card.

21. The combination of claim 20, wherein the carrier includes a window adapted to display the account identifier for viewing external to the carrier.

22. The combination of claim 20, wherein the carrier includes indicia representing that the store-value card includes the light configured to be illuminated.

23. The combination of claim 20, wherein the carrier is adapted to be selectively foldable between a first configuration and a second configuration, the first configuration is adapted to display the stored-value card in a retail setting, and the second configuration is adapted to wrap the stored-value card for presentation to a recipient.

24. A stored-value card comprising:
    a housing including a first primary panel and a second primary panel spaced from the first primary panel, wherein the first primary panel defines an account identifier signifying a financial account linked to the stored-value card, and wherein a side is defined between the first primary panel and the second primary panel; and
    a light circuit including a light and a switch, the light circuit being generally enclosed within the housing but for the light, wherein the light extends from the side of the housing and is configured to be illuminated upon application of a force to the switch;
    wherein the housing defines a side wall extending between and about a perimeter of each of the first primary panel and the second primary panel, and wherein the light extends from the housing through the side wall.

25. A gift card having a generally planar primary surface and a side wall extending about and generally perpendicular to the generally planar primary surface, the gift card including:
    means for providing decorative indicia to the primary surface;
    means for providing illumination to at least a portion of the side wall;
    means for at least partially housing the means for providing illumination, the means for at least partially housing including a first panel and a second panel spaced from one another to define a cavity between the first panel and the second panel, the means for at least partially housing including a side wall extending between the first panel and the second panel about the perimeter of the first panel and the second panel to enclose the cavity, wherein the means for providing illumination is at least partially housed within the cavity;
    means for linking the gift card to a financial account or a financial record; and
    means for illuminating the means for providing illumination upon a demand to collectively provide a visual presentation with the decorative indicia.

26. The gift card of claim 25, further including means for associating the gift card with at least one of a product brand, a store, a holiday, a season, an occasion, and media format indicia.

27. The gift card of claim 25, in combination with means for removably supporting the gift card for display in a retail setting including means for facilitating activation of the gift card through the means for removably supporting the gift card.

28. A method of promoting sales of a stored-value card, the method comprising:
    providing a stored-value card including a light circuit with a light, a housing substantially enclosing the light circuit, and a link to a financial account or record, wherein the housing defines an aperture;
    providing the stored-value card with indicia, wherein the light and the indicia collectively define a visual presentation of one of a subject and a scene; and
    providing a button formed separately from the housing and positioned within the aperture of the housing, wherein when a user presses the button, the button moves relative to the housing and interacts with the light circuit such that the light is illuminated for a period of time.

29. The method of claim 28, further comprising:
    using the stored-value card in payment of goods or services, the value of the goods or services being deducted from the financial account or the financial record.

30. The method of claim 28, further comprising:
    activating the stored-value card by scanning an account identifier on the stored-value card through an opening in a package that houses the stored-value card.

31. The method of claim 30, further comprising:
    adding additional value to the stored-value card, wherein the adding includes scanning the account identifier.

* * * * *